United States Patent
Li et al.

(10) Patent No.: US 11,087,763 B2
(45) Date of Patent: Aug. 10, 2021

(54) VOICE RECOGNITION METHOD, APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Chao Li, Beijing (CN); Weixin Zhu, Beijing (CN); Ming Wen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 83 days.

(21) Appl. No.: 16/236,295

(22) Filed: Dec. 28, 2018

(65) Prior Publication Data
US 2019/0325877 A1    Oct. 24, 2019

(30) Foreign Application Priority Data
Apr. 20, 2018    (CN) .......................... 201810359112.4

(51) Int. Cl.
G10L 15/28    (2013.01)
G06N 3/08    (2006.01)
(Continued)

(52) U.S. Cl.
CPC .............. *G10L 15/285* (2013.01); *G06N 3/08* (2013.01); *G06N 5/046* (2013.01); *G10L 15/16* (2013.01); *G10L 15/183* (2013.01)

(58) Field of Classification Search
USPC .......................... 704/231, 246, 247, 250–252
See application file for complete search history.

(56) References Cited

U.S. PATENT DOCUMENTS 10,068,557 B1 *    9/2018    Engel .................. G10H 1/0041
2016/0099010 A1    4/2016    Sainath et al.
(Continued)

FOREIGN PATENT DOCUMENTS

| CN | 101447183 A | 6/2009 |
| CN | 102446504 A | 5/2012 |

(Continued)

OTHER PUBLICATIONS

First Office Action of parallel JP application.
(Continued)

*Primary Examiner* — Leonard Saint Cyr
(74) *Attorney, Agent, or Firm* — J.C. Patents (57) ABSTRACT

A voice recognition method is provided by embodiments of the present application. The method includes: obtaining a voice signal to be recognized; and recognizing a current frame in the voice signal using a pre-trained causal acoustic model, according to the current frame in the voice signal and a frame within a preset time period before the current frame, the causal acoustic model being derived based on a causal convolutional neural network training. In the method provided by the embodiments of the present application, only the information of the current frame and the frame before the current frame is used when performing the recognition of the current frame, thereby solving a problem in voice recognition technologies based on prior art convolutional neural network where a hard delay is created because there is a need to wait for the frames after the current frame, improving the timeliness of the voice recognition.

16 Claims, 4 Drawing Sheets

(51) Int. Cl.
*G06N 5/04* (2006.01)
*G10L 15/16* (2006.01)
*G10L 15/183* (2013.01)

(56) References Cited

U.S. PATENT DOCUMENTS

| | | | | |
|---|---|---|---|---|
| 2018/0075343 | A1* | 3/2018 | van den Oord | G10L 13/086 |
| 2018/0082679 | A1* | 3/2018 | McCord | G10L 13/033 |
| 2018/0197533 | A1* | 7/2018 | Lyon | G10L 19/26 |
| 2018/0261213 | A1* | 9/2018 | Arik | G06N 3/0445 |
| 2019/0318755 | A1* | 10/2019 | Tashev | G10L 25/84 |

FOREIGN PATENT DOCUMENTS

| | | |
|---|---|---|
| CN | 105845128 A | 8/2016 |
| CN | 106782504 A | 5/2017 |
| CN | 107293288 A | 10/2017 |
| CN | 107301860 A | 10/2017 |
| JP | H0635498 | 2/1994 |
| WO | WO2018048945 A1 | 3/2018 |

OTHER PUBLICATIONS

Speech-to-Text-WaveNet.
The Chinese First Examination Report, including search report, of corresponding Chinese application No. 1201810359112.4, dated Jan. 15, 2019.
The Chinese Notice of Allowance of corresponding Chinese application No. 201810359112.4, dated Mar. 18, 2019.

* cited by examiner

VOICE RECOGNITION METHOD, APPARATUS, DEVICE AND STORAGE MEDIUM

CROSS-REFERENCE TO RELATED APPLICATION

This application claims priority to Chinese Patent Application No. 201810359112.4, filed on Apr. 20, 2018, which is hereby incorporated by reference in its entirety.

TECHNICAL FIELD

Embodiments of the present application relates to the field of voice recognition technology, and in particular to a voice recognition method, apparatus, device and storage medium.

BACKGROUND

With the continuous development of computer science and technology, especially artificial intelligence (AI) technology, voice recognition technology has begun to go from the laboratory to the market, and is applied in more and more fields, such as a voice input system, a voice control system used for industrial control, smart home, smart toy, and a terminal device, and intelligent dialog query system. The voice recognition technology makes information acquisition and processing more convenient, improves user productivity, and brings convenience to people's lives.

Convolutional Neural Network (CNN) is a feed-forward neural network that has performed well in the field of pattern recognition, which has been favored in recent years and has been widely used. The use of CNN is also becoming more and more popular in the field of voice processing, and since the convolution kernel thereof is usually developed to the left and right, it is necessary to use the information of a frame before a current frame and that after the current frame when the voice recognition is performed, that is, when the voice recognition of the current frame is performed, future information may be utilized. For example, when the voice recognition is performed using a convolutional neural network with a context of 2, it is necessary to use information of 5 frames including the (N−2)-th, (N−1)-th, N-th, (N+1)-th, and (N+2)-th frames, when voice recognition of the N-th frame is performed. Thus, the voice recognition system needs to wait for 2 frames, until information of these 5 frames are all obtained, before processing the information. Such waiting will inevitably cause a hard delay of 2 frames, which is unacceptable in many occasions where a requirement of real time performance is high.

In summary, the voice recognition technology based on convolutional neural network in the prior art cannot meet the requirement of high real-time performance.

SUMMARY

Embodiments of the present application provide a voice recognition method, apparatus, device and storage medium, which are used to solve the problem in the prior art voice recognition technology based on the convolutional neural network where a hard delay exists to preclude meeting the requirement of high real-time performance.

In a first aspect, an embodiment of the present application provides a voice recognition method, including:
obtaining a voice signal to be recognized; and
recognizing a current frame in the voice signal using a pre-trained causal acoustic model, according to the current frame in the voice signal and a frame within a preset time period before the current frame, the causal acoustic model being derived based on a causal convolutional neural network training.

In a specific implementation, the method further includes:
supplementing a null frame if there is not enough frame before the current frame.

In a specific implementation, the preset time period is determined according to a value of a context parameter of the causal acoustic model.

In a specific implementation, the causal acoustic model includes a plurality of stacked causal convolutional layers, the causal convolutional layers being used for expanding a receptive field of the causal acoustic model.

In a specific implementation, the causal acoustic model further includes at least one layer of long short-term memory networks, the long short-term memory networks being used for learning historical information of the voice signal.

In a specific implementation, before the recognizing the current frame in the voice signal, the method further includes:
performing a high-pass filtering on the voice signal to be recognized; and
eliminating an interference signal in the voice signal after the high-pass filtering.

In a specific implementation, the interference signal includes a noise signal and/or an echo signal.

In a second aspect, an embodiment of the present application provides a voice recognition apparatus, including:
an obtaining module, configured to obtain a voice signal to be recognized; and
a recognizing module, configured to recognize a current frame in the voice signal using a pre-trained causal acoustic model, according to the current frame in the voice signal and a frame within a preset time period before the current frame, the causal acoustic model being derived based on a causal convolutional neural network training.

In a third aspect, an embodiment of the present application provides a voice recognition device, including:
a memory;
a processor; and
a computer program;
where the computer program being stored in the memory, is configured to be executed by the processor to implement any one according to the aforementioned methods.

In a fourth aspect, an embodiment of the present application provides a computer readable storage medium storing a computer program, when executed by a processor, implements any one according to the aforementioned the methods.

In the voice recognition method, apparatus, device and storage medium provided by the embodiments of the present application, a voice signal to be recognized is obtained, and then a current frame in the voice signal is recognized using a pre-trained causal acoustic model according to the current frame in the voice signal and a frame within a preset time period before the current frame, the causal acoustic model being derived based on a causal convolutional neural network training. In the method provided by the embodiments of the present application, only the information of the current frame and the frame before the current frame is used when performing the recognition of the current frame, which solves the hard delay problem caused by the voice recognition technology based on the convolutional neural network in the prior art that needs to wait for frames after the current frame, and improves the real-time performance of the voice recognition.

BRIEF DESCRIPTION OF THE DRAWINGS

Following drawings of the present disclosure are incorporated herein as part of the present description, illustrating embodiments of the disclosure, and together with the description, explaining the principles of the disclosure.

The embodiments of the present application have been shown in the above drawings, and more detail will be described hereinafter. The drawings and the description are not intended to limit the scope of the present application in any way, but rather to illustrate the concept of the present application to those skilled in the art by referring to the specific embodiments.

DETAILED DESCRIPTION

Exemplary embodiments will be described in detail herein, examples of which are illustrated in the accompanying drawings. When the following description refers to the accompanying drawings, unless otherwise indicated, like numerals in different drawings indicate the same or similar elements. The embodiments described in the following exemplary embodiments do not represent all embodiments consistent with the present application. Instead, they are merely examples of apparatus and methods consistent with some aspects of the application as detailed in the appended claims.

The terms "comprise/include", "have" and variations thereof in the description and claims of the present application are intended to cover a non-exclusive inclusion. For example, a process, method, system, product, or device that "comprises/includes" a series of steps or units is not limited to the steps or units which are listed, but optionally includes steps or units which are not listed, or optionally also includes other steps or units inherent to these processes, methods, products or devices.

The terms "first" and "second" in the present application are used for identification purposes only, and are not to be construed as indicating or implying any sequential relationship, relative importance, or implicitly indicating the number of the indicated technical features. The term "a plurality of" means two or more. The term "and/or" in describing the association relationship of the associated objects represents that there may be three relationships. For example, A and/or B may indicate three cases: A alone, A and B together, and B alone. The character "/" generally indicates that the contextual object thereof is an "or" relationship.

The term "one embodiment" or "an embodiment" referred to throughout the description of the present application means that a particular feature, structure, or characteristics relating to the embodiment is included in at least one embodiment of the present application. Thus, the term "in one embodiment" or "in an embodiment" appearing throughout the specification are not necessarily referring to the same embodiment. It should be noted that the embodiments of the present application and the features of the embodiments may be combined with each other without conflict.

Figure 1:
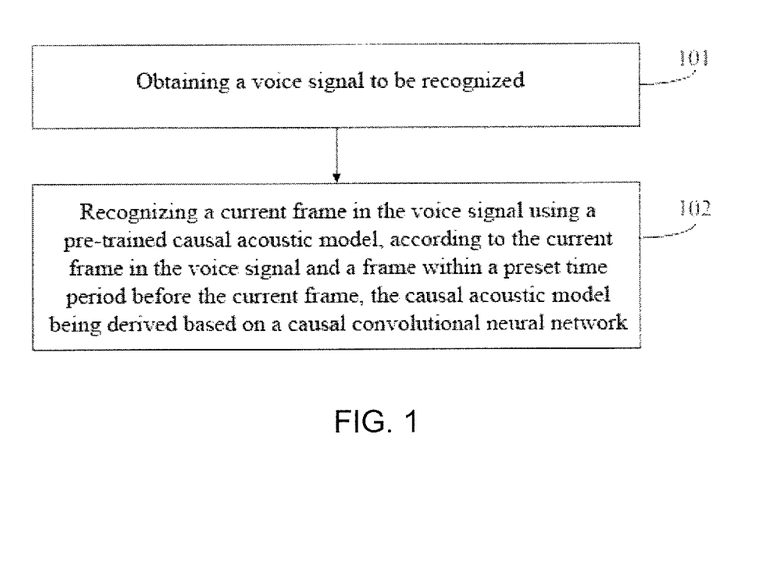
FIG. 1 is a schematic flowchart of a voice recognition method according to an embodiment provided by the present application.

The embodiment of the present application provides a voice recognition method, referring to FIG. 1. The embodiment of the present application is illustrated by taking FIG. 1 as an example only, and the present application is not limited thereto. FIG. 1 is a schematic flowchart of a voice recognition method according to an embodiment provided by the present application. The execution entity of the present embodiment includes, but is not limited to, at least one of the following: a user device, and a network device. The user device includes, but is not limited to, a computer, a smart phone, a PDA, and the like. The network device includes, but is not limited to, a single network server, a server group including a plurality of network servers, or a cloud including a large number of computers or network servers based on cloud computing, where the cloud computing is one type of distributed computing, i.e., a virtual super computer including a group of computers loosely coupled. This embodiment shall not limit herein. As shown in FIG. 1, the voice recognition method provided by the present embodiment may include:

Step 101: obtaining a voice signal to be recognized.

When the execution entity is a user device, for example, an electronic device equipped with a microphone (mic), the electrical device including but not limited to a smartphone, a tablet, an e-book reader, a laptop portable computer, and a desktop computer, it is capable to collect a voice signal via the microphone in the user device to obtain the voice signal to be recognized. When the execution entity is a network device, such as a server, the server may receive a voice signal sent from a user device to obtain the voice signal to be recognized.

Step 102: recognizing a current frame in the voice signal using a pre-trained causal acoustic model, according to the current frame in the voice signal and a frame within a preset time period before the current frame, the causal acoustic model being derived based on a causal convolutional neural network training.

The causal acoustic model is trained using voice data in an annotated voice database. The present embodiment does not limit the voice database and the training method used in the training. It should be noted that a length of the frame in the present embodiment may be set according to an actual requirement. Considering a requirement of real-time of voice recognition, the length of the frame in the present embodiment should not be set too long. For example, the length of one frame can be set to 10 milliseconds.

In a non-causal acoustic model built based on convolutional neural network (CNN) in the prior art, since the convolution is usually developed to the left and right, and thus it is necessary to use the information of the frames both before and after the current frame when the voice recognition is performed, that is, when the voice recognition of the current frame is performed, it is necessary to wait for the frames after the current frame, causing a hard delay. For example, when the voice recognition is performed using a convolutional neural network with a context of 2, it is necessary to use information of 5 frames including the (N−2)-th, (N−1)-th, N-th, (N+1)-th, and (N+2)-th frames, when voice recognition of the N-th frame is performed. That is, the voice recognition system needs to wait for the information of 2 frames, e.g., the (N+1)-th, and (N+2)-th frames, when the recognition of the N-th frame is performed. Putting off the processing until the information of these 5 frames is ready will inevitably cause a hard delay of 2 frames. When the length of one frame is 10 milliseconds, this will cause a hard delay of 20 milliseconds, failing to meet the requirement of high real-time performance of some applications. The larger the value of the context parameter of the convolutional neural network is, the more the frames causing the hard delay are.

This embodiment provides a causal acoustic model which, when being used to recognize the current frame in the voice signal to be recognized, only uses the information of the current frame and the frame before the current frame without waiting, for performing recognition of the voice, avoiding the hard delay. The causal acoustic model in the present embodiment can be obtained based on a network training with causal relationship, that is, the output of the network at the current moment is only related to its historical input, and has nothing to do with the future input.

In a specific implementation, the causal acoustic model can be derived based on a causal convolutional neural network training. For example, a causal acoustic model built for a convolutional neural network with a context of 2 may need to use information of 5 frames, including the (N−4)-th, (N−3)-th, (N−2)-th, N-th, (N−1)-th, and N-th frames, when voice recognition on the N-th frame is performed. That is, only the information of the frames before the current frame is used when the voice recognition is performed, without waiting, and the hard delay is avoided.

In a possible implementation, the causal acoustic model can also be derived based on a causal network (such as a Bayesian network) training.

It should be noted that the preset time period in the present embodiment is determined according to a value of a context parameter of the causal acoustic model. In a possible implementation, the value of the preset time period may be equal to twice the value of the context parameter multiplied by the frame length. The values in the present embodiment are merely illustrative and are not intended to limit the application.

The voice recognition method provided by the present embodiment can be used in voice search, voice input, voice interaction, and a variety of other applications that require high performance of real time. For an application that does not require high performance of real time, the method provided in the present embodiment can still be applied to improve the performance of real time, thereby further enhancing user experience.

In the voice recognition method provided by this embodiment, a voice signal to be recognized is obtained, and then is recognized using a pre-trained causal acoustic model according to a current frame in the voice signal and a frame within a preset time period before the current frame, where the causal acoustic model is derived based on a causal convolutional neural network training. In the method provided by the embodiments of the present application, only the information of the current frame and the information of the frame before the current frame are used when performing the recognition of the current frame, thereby solving the problem of hard delay existing in the voice recognition technology based on the convolutional neural network in the prior art, due to that there is a need to wait for the frames after the current frame, thereby improving the performance of real time of the voice recognition.

On the basis of the above embodiment, the present embodiment further provides a voice recognition method to address a situation where the causal acoustic model does not have enough frames before a current frame when the current frame is being recognized in the previous embodiment. For example, when the current frame is the first frame, there is no previous frame data. Or, for a causal convolutional neural network whose context is 2, the data of 4 frames before the current frame is required, and when the current frame is the first frame, the second frame, the third frame, or the fourth frame, there are not enough frames before the current frame. In the voice recognition method provided in the present embodiment, a null frame is supplemented if there is not enough frame before the current frame. The null frame in the present embodiment can be implemented by using an all zero vector.

Figure 2:
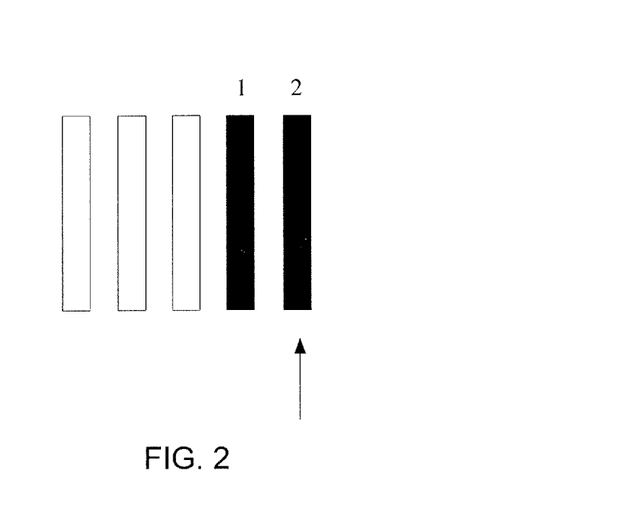
FIG. 2 is a schematic diagram of supplementing a null frame in an embodiment of the present application.

The following uses a specific example to illustrate supplementing the null frame. For a causal acoustic model obtained by a causal convolutional neural network training based on a context parameter value of 2, when voice signal recognition of a second frame is performed, a null frame can be supplemented before the current frame, referring to the method shown in FIG. 2. FIG. 2 is a schematic diagram of supplementing a null frame in an embodiment of the present application. As shown in FIG. 2, a black frame indicates a data frame having real data, and a white frame indicates a null frame composed of all zero vectors. The arrow points to the current frame, i.e., the second frame is the current frame. The frame information before the current frame is not enough to complete the recognition of the current frame, and thus three null frames composed of all zero vectors are supplemented before the current frame to have 5 frames for completing the recognition of the current frame.

The number of data frames required to recognize the current frame depends on the context value C of the causal convolutional neural network in the causal acoustic model. The number of data frames required to recognize the current frame may be equal to (2C+1), that is, to recognize the current frame, it needs the information of the current frame and the information of 2C frames before the current frame. Therefore, if the number of data frames before the current frame is less than 2C, a null frame(s) needs to be supplemented to complete the recognition of the current frame, that is, if the frame number N of the current frame is smaller than (2C+1), it is necessary to supplement (2C+1−N) null frames before the current frame.

On the basis of any of the above embodiments, the present embodiment further describes the specific implementation of the causal acoustic model in the above embodiment. In order to expand a receptive field of the causal acoustic model, the causal acoustic model in the voice recognition method provided by the present embodiment may include a plurality of stacked causal convolution layers.

In a specific implementation, in order to make fuller use of historical information to improve an accuracy of voice recognition, the causal acoustic model in the voice recognition method provided in the present embodiment may further include at least one layer of long short-term memory (LSTM) network on the basis of the above embodiments. The LSTM network is a time recurrent neural network, that can make full use of long-term historical information. The LSTM in the present embodiment is used to learn historical information of the voice signals.

On the basis of the above embodiments, the present embodiment combines the above embodiments, and the present embodiment only shows one of the possible combinations.

In order to expand the receptive field, the stacked causal convolutional layer can be used. For this stacked causal convolutional neural network, if the value of the context of each layer is always 1, then the first layer can see the past 2 frames, the second layer can see the past 4 frames, the third layer can see the past 6 frames, and the fourth layer can see the past 8 frames. The information of the past 8 frames is used to recognize the current frame. The larger the value of the context, the more the stacked causal convolutional layers, and the more the information of the past frames available. In order to preserve more long term information, a multi-layer LSTM networks is used on the stacked causal convolutional neural network layer, to learn the historical information of the voice signal. The more stacked network layers, the more information can be utilized, but the more complexity is increased at the same time.

Figure 3:
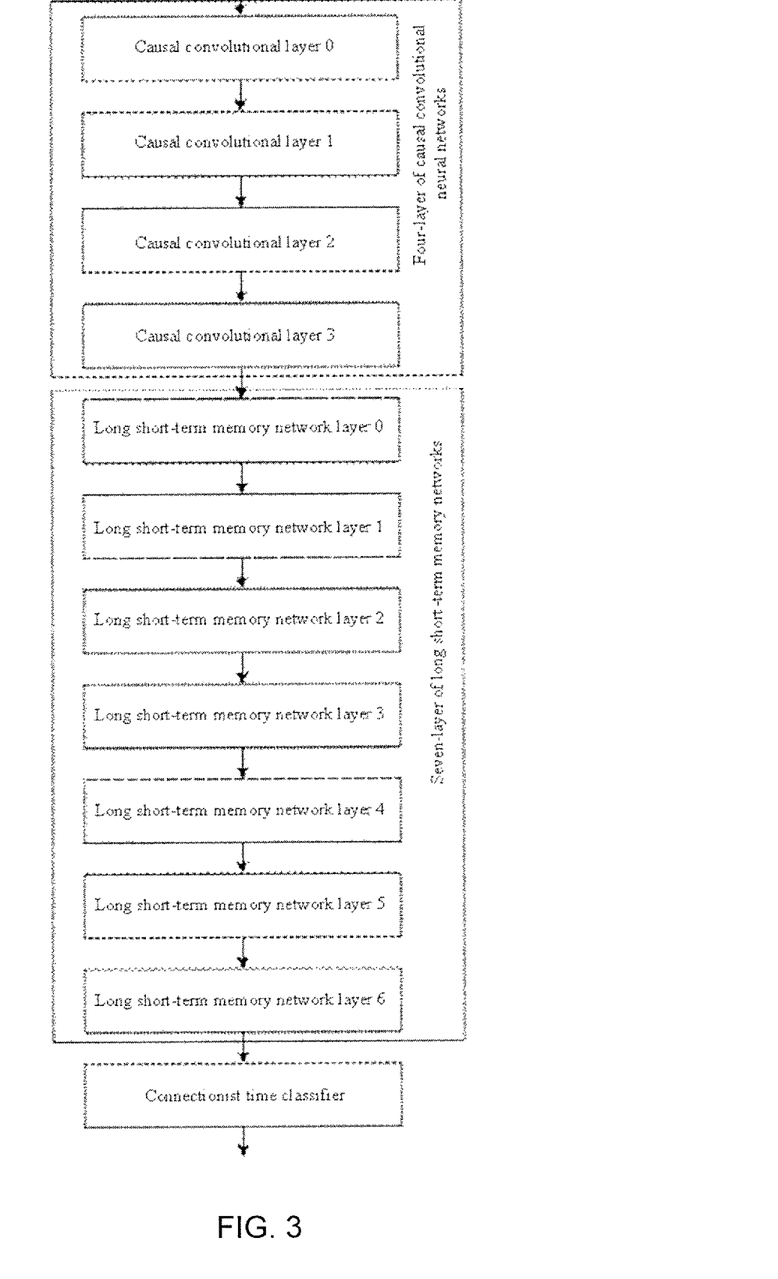
FIG. 3 is a schematic structural diagram of a causal acoustic model according to an embodiment of the present application.

The voice recognition method provided by the present embodiment balances the quantity of information and complexity. The voice recognition method provided in the present embodiment may use a causal acoustic model as shown in FIG. 3. FIG. 3 is a schematic structural diagram of a causal acoustic model according to an embodiment of the present application. As shown in FIG. 3, the causal acoustic model may include a four-layer causal convolutional neural network: causal convolutional layers 0 to 3, a seven-layer long short-term memory network: long short-term memory network layers 0 to 6, and a connectionist time classifier.

The voice recognition method provided by the present embodiment uses a four-layer stacked causal convolutional neural network to expand the receptive field, utilizing as much information as possible. When the recognition of the voice signal of the current frame is performed, the information of more past frames is utilized. Moreover, only the information of the past frames needs to be utilized, without waiting for the information of any future frame, so that the requirement of high real-time performance can be satisfied. The causal convolutional neural network is used as a underlying network structure to meticulously perceive vocal characteristics of each frame, while the upper layer uses the LSTM network, which is a time recurrent neural network, for storing longer term information. The causal acoustic model used in the voice recognition method provided by the present embodiment combines the causal convolutional neural network and the LSTM network. Thus, when the recognition of the voice signal of the current frame is performed, the information of the current frame can be perceived, while the information of the long-term historical frame can also be utilized, thereby improving the accuracy of the voice recognition. In summary, the voice recognition method provided by the present embodiment can not only meet the requirement of high real-time performance, but also has high recognition accuracy, which further improves the user experience.

Considering a causal acoustic model is typically trained using a clean voice signal in the voice database, that is, the causal acoustic model is obtained by training based on the clean voice signal, thus, in order to further improve the accuracy of the voice recognition, on the basis of any of the above embodiments, before recognizing the current frame in the voice signal, the voice recognition method provided by the present embodiment may further include:

performing a high-pass filtering on the voice signal to be recognized, so as to block or attenuate any voice signal whose frequency is less than a preset frequency threshold; and eliminating an interference signal in the voice signal after the high-pass filtering. Optionally, the interference signal may include a noise signal and/or an echo signal.

The noise signal can exist in various environments, such as a public place, a moving vehicle and the like. Even in a quiet environment, there may still exist some smooth background noise. Therefore, the obtained voice signal to be recognized will inevitably include a noise signal, and the noise signal in the voice signal after the high-pass filtering may be eliminated by using a Least Mean Square (LMS) filtering algorithm or a Lyapunov noise active control algorithm and the like.

When an electronic device for obtaining the voice signal to be recognized is equipped with a speaker, the user may use a Text to Voice (TTS) play back function of the electronic device to playback, e.g., navigation voice, news reading broadcast voice, and etc., or in the case of voice interaction, a sound emitted from the speaker of the electronic device can be transmitted to a microphone via a medium such as air and etc., to form an acoustic echo. At this time, the interference signal may also include the echo signal transmitted from the speaker to the microphone. Acoustic Echo Cancellation (AEC) technology can be used to eliminate the echo signal in the voice signal after the high-pass filtering.

Figure 4:
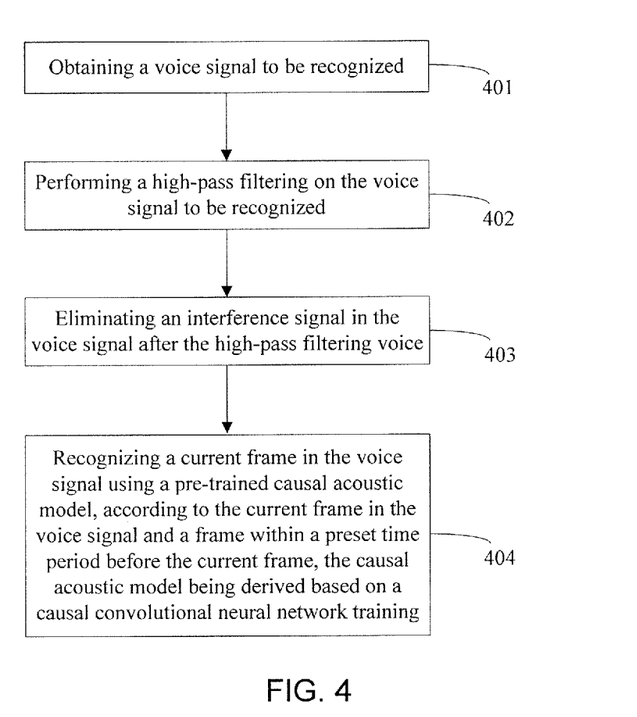
FIG. 4 is a schematic flowchart of a voice recognition method according to another embodiment provided by the present application.

An embodiment of the present application further provides a voice recognition method, referring to FIG. 4. It should be noted that the embodiment of the present application is illustrated by taking FIG. 4 as an example only, and the present application is not limited thereto. FIG. 4 is a schematic flowchart of a voice recognition method according to another embodiment, provided by the present application. As shown in FIG. 4, the voice recognition method provided by the present embodiment may include:

Step 401: obtaining a voice signal to be recognized.

Step 402: performing a high-pass filtering on the voice signal to be recognized.

Step 403: eliminating an interference signal in the voice signal after the high-pass filtering.

Step 404: recognizing a current frame in the voice signal using a pre-trained causal acoustic model, according to the current frame in the voice signal and a frame within a preset time period before the current frame, where the causal acoustic model is derived based on a causal convolutional neural network training.

The voice recognition method provided in the present embodiment improves the accuracy of the recognition by performing high-pass filtering processing and de-interference processing on the voice signal to be recognized. By using the causal acoustic model, when the recognition of the current frame is performed, there is no need to wait for the frame after the current frame, and the hard delay is avoided, which can meet the requirement of high real-time performance. The voice recognition method provided in the present embodiment not only solves the problem of hard delay existing in the voice recognition technology based on the convolutional neural network in the prior art, due to that there is a need to wait for the frames after the current frame, thereby not only improving the performance of real time of the voice recognition, but also improving the accuracy of the recognition, and further improving user experience.

Figure 5:
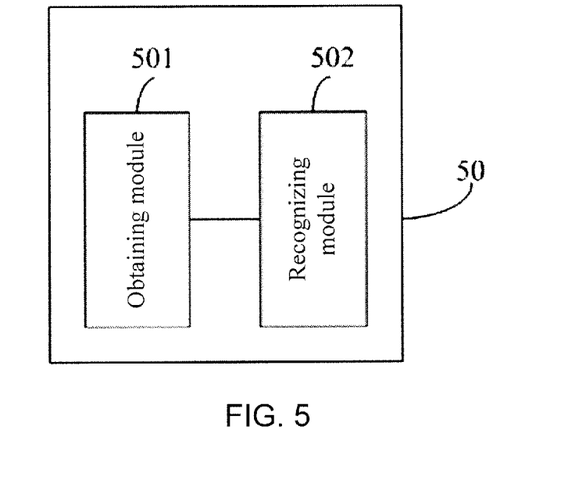
FIG. 5 is a schematic structural diagram of a voice recognition apparatus provided by an embodiment of the present application.

An embodiment of the present application further provides a voice recognition apparatus, referring to FIG. 5. It should be noted that the embodiment of the present application is illustrated by taking FIG. 5 as an example only, and the present application is not limited thereto. FIG. 5 is a schematic structural diagram of a voice recognition apparatus provided by an embodiment of the present application. As shown in FIG. 5, the voice recognition apparatus 50 provided by the present embodiment may include: an obtaining module 501 and a recognizing module 502.

Where, the obtaining module 501 is configured to obtain a voice signal to be recognized, and the recognizing module 502 is configured to recognize a current frame in the voice signal using a pre-trained causal acoustic model, according to the current frame in the voice signal and a frame within a preset time period before the current frame, where the causal acoustic model is derived based on a causal convolutional neural network training.

The apparatus of the present embodiment may be configured to perform the technical solution of the embodiment methods shown in FIG. 1, following similar principals and producing similar technical effects, which will not be repeated herein.

Optionally, a null frame is supplemented if there is not enough frame before the current frame.

Optionally, the preset time period can be determined according to a value of a context parameter of the causal acoustic model.

Optionally, the causal acoustic model may include a plurality of stacked causal convolutional layers which are used for expanding a receptive field of the causal acoustic model.

Optionally, the causal acoustic model may further include at least one layer of long short-term memory network, where the long short-term memory network is used for learning historical information of the voice signal.

On the basis of any of the above embodiments, the voice recognition apparatus provided in the present embodiment may further include: a filtering module and a de-interference module, where the filtering module is configured to perform high-pass filtering processing on the voice signal to be recognized before the recognizing module 501 recognizes the current frame in the voice signal. The de-interference module is configured to eliminate an interference signal in the voice signal after the high-pass filtering.

The apparatus of the present embodiment may be configured to perform the technical solution of the embodiment methods shown in FIG. 1 or 4, following similar principals and producing similar technical effects, which will not be repeated herein.

Optionally, the interference signal may include a noise signal and/or an echo signal.

Figure 6:
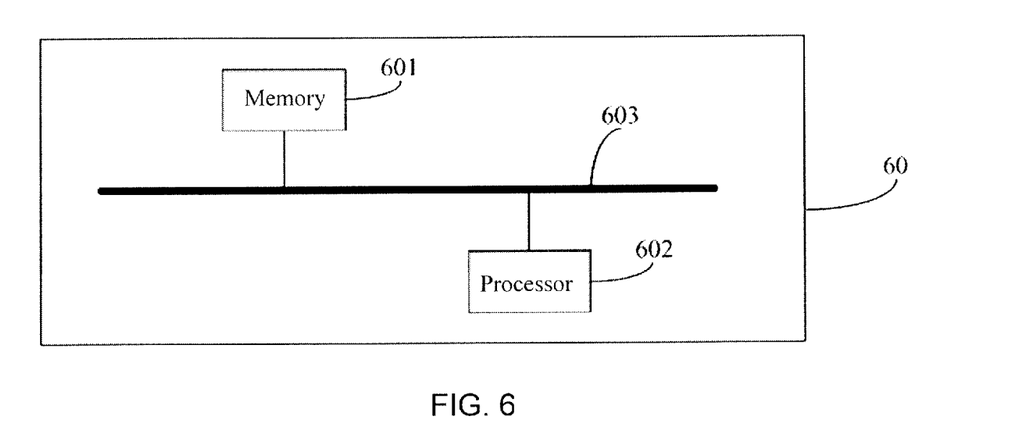
FIG. 6 is a schematic structural diagram of a voice recognition device provided by an embodiment of the present application.

An embodiment of the present application further provides a voice recognition device, referring to FIG. 6. It should be noted that the embodiment of the present application is illustrated by taking FIG. 6 as an example only, and the present application is not limited thereto. FIG. 6 is a schematic structural diagram of a voice recognition device provided by an embodiment of the present application. As shown in FIG. 6, the voice recognition device 60 provided by the present embodiment may include: a memory 601, a processor 602, and a bus 603. The bus 603 is configured to implement interconnection between each component.

A computer program is stored in the memory 601. When the computer program is executed by the processor 602, the technical solution of any of the above method embodiments can be implemented.

The memory 601 and the processor 602 are electrically connected directly or indirectly to implement data transmission or interaction. For example, these components can be electrically connected to one another via one or more communication buses or signal lines, such as via the bus 603. The memory 601, with the computer program for a voice recognition method stored therein, includes at least one software function module stored therein in a form of software or firmware. The processor 602 executes various functional applications and data processing, by running software programs and modules stored in the memory 601.

The memory 601 may be, but not limited to, a Random Access Memory (RAM), a Read Only Memory (ROM), a Programmable Read-Only Memory (PROM), an Erasable Programmable Read-Only Memory (EPROM), an Electric Erasable Programmable Read-Only Memory (EEPROM), and the like. Where, the memory 601 is configured to store a program, and the processor 602 executes the program after receiving an execution instruction. Further, the software program and module in the above memory 601 may further include an operating system, which may include a variety of software components and/or drivers for managing system tasks (for example, memory management, storage device control, power management, etc.), and may communicate with various hardware or software components to provide an operating environment for other software components.

The processor 602 can be an integrated circuit chip with signal processing capabilities. The processor 602 in above may be a general-purpose processor, including a Central Processing Unit (CPU), a Network Processor (NP), and the like, in which the methods, steps, and logical block diagrams disclosed in the embodiments of the present application may be implemented or carried out. The general-purpose processor may be a microprocessor or any conventional processor or the like.

It will be understood that the structure in FIG. 6 is merely illustrative, and the components included may be more or less than those shown in FIG. 6, or may have a different configuration than that shown in FIG. 6. Various components shown in FIG. 6 can be implemented using hardware and/or software.

For example, when the voice recognition device is a user device, it may also include an audio component for outputting and/or inputting an audio signal. In the present embodiment, the audio component can be used to obtain a voice signal to be recognized.

The voice recognition device of this embodiment may be configured to perform the technical solutions of any of the embodiment methods described above, following similar principals and producing similar technical effects, which will not be repeated herein.

An embodiment of the present application further provides a computer readable storage medium having a computer program stored therein, where the computer program is executed by a processor to implement the technical solution of any of the foregoing method embodiments.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A voice recognition method, comprising:
    obtaining a voice signal to be recognized; and
    recognizing a current frame in the voice signal using a pre-trained causal acoustic model, according to a current frame in the voice signal and a frame within a preset time period before the current frame, the causal acoustic model being derived based on a causal convolutional neural network training, wherein the causal acoustic model includes a plurality of stacked causal convolutional layers, at least one layer of long short-term memory networks, and a connectionist time classifier, wherein the preset time period is determined according to a value of a context parameter of the causal acoustic model, and the value of the preset time period is equal to twice the value of the context parameter multiplied by a frame length.

2. The method according to claim 1, further comprising: supplementing a null frame if there is not enough frame before the current frame.

3. The method according to claim 1, wherein the causal convolutional layers are used for expanding a receptive field of the causal acoustic model.

4. The method according to claim 3, wherein the long short-term memory networks are used for learning historical information of the voice signal.

5. The method according to claim 1, wherein before the recognizing the current frame in the voice signal, the method further comprises:
performing a high-pass filtering on the voice signal; and
eliminating an interference signal in the voice signal after the high-pass filtering.

6. The method according to claim 5, wherein the interference signal comprises a noise signal and/or an echo signal.

7. The method according to claim 1, wherein the causal acoustic model comprises a four-layer causal convolutional neural network, a seven-layer long short-term memory network and the connectionist time classifier.

8. The method according to claim 1, wherein the causal convolutional neural network has a context of 2.

9. A non-transitory computer readable storage medium, storing a computer program, when executed by a processor, which implements the method according to claim 1.

10. A voice recognition device, comprising:
a memory, configured to store an instruction;
a processor, configured to execute the instruction to:
obtain a voice signal to be recognized;
recognize a current frame in the voice signal using a pre-trained causal acoustic model, according to the current frame in the voice signal and a frame within a preset time period before the current frame, the causal acoustic model being derived based on a causal convolutional neural network training, wherein the causal acoustic model includes a plurality of stacked causal convolutional layers, at least one layer of long short-term memory networks, and a connectionist time classifier, wherein the preset time period is determined according to a value of a context parameter of the causal acoustic model, and the value of the preset time period is equal to twice the value of the context parameter multiplied by a frame length.

11. The device according to claim 10, wherein the processor is further configured to:
supplement a null frame if there is not enough frame before the current frame.

12. The device according to claim 10, wherein the causal convolutional layers are used for expanding a receptive field of the causal acoustic model.

13. The device according to claim 12, wherein the long short-term memory networks are used for learning historical information of the voice signal.

14. The device according to claim 10, wherein before the recognizing the current frame in the voice signal, the processor is further configured to:
perform a high-pass filtering on the voice signal; and
eliminate an interference signal in the voice signal after the high-pass filtering.

15. The device according to claim 14, wherein the interference signal comprises a noise signal and/or an echo signal.

16. The device according to claim 10, wherein the causal acoustic model comprises a four-layer causal convolutional neural network, a seven-layer long short-term memory network and the connectionist time classifier.

* * * * *